United States Patent [19]

Fukushima

[11] Patent Number: 5,293,318

[45] Date of Patent: Mar. 8, 1994

[54] NAVIGATION SYSTEM

[75] Inventor: Atsuhiko Fukushima, Kawagoe, Japan

[73] Assignee: Pioneer Electronic Corporation, Tokyo, Japan

[21] Appl. No.: 909,622

[22] Filed: Jul. 7, 1992

[30] Foreign Application Priority Data

Jul. 10, 1991 [JP] Japan ................................. 3-170060

[51] Int. Cl.$^5$ ............................................. G06F 15/50
[52] U.S. Cl. ................................. 364/449; 364/443; 342/357; 342/457; 340/990; 340/995; 73/178 R
[58] Field of Search ............ 364/443, 444, , 453, 364/454, 457, 449; 73/178 R; 342/357, 358, 450, 451, 457; 340/988, 990, 995; 33/356, 357

[56] References Cited

U.S. PATENT DOCUMENTS

| | | | |
|---|---|---|---|
| 4,899,285 | 2/1990 | Nakayama et al. | 364/449 |
| 4,903,212 | 2/1990 | Yokouchi et al. | 342/357 |
| 4,928,107 | 5/1990 | Kuroda et al. | 364/449 |
| 4,949,268 | 8/1990 | Nishikawa et al. | 342/357 |
| 5,087,919 | 2/1992 | Odagawa et al. | 342/357 |
| 5,179,519 | 1/1993 | Adachi et al. | 340/990 |
| 5,220,509 | 6/1993 | Takemura et al. | 340/988 |

*Primary Examiner*—Gary Chin
*Attorney, Agent, or Firm*—Kane, Dalsimer, Sullivan, Kurucz, Levy, Eisele and Richard

[57] ABSTRACT

A navigation system on an automobile has a GPS receiver for producing first positional data indicating the automobile position based on radio waves from GPS satellites, and a self-operating sensor for producing second positional data indicating the automobile position based on speed and orientation sensor signals. A data processor compares previous and present first positional data to determine whether the difference therebetween is equal to or smaller than a first predetermined value, and also determines whether a PDOP value of the present first positional data is equal to or smaller than a second predetermined value. The present first positional data and the second positional data are compared to determine whether the distance between the present position of the automobile as indicated by the present first positional data and the present position of the automobile as indicated by the second positional data is equal to or greater than a third predetermined value. The data processor outputs the first positional data as present positional data if the difference between the previous and present first positional data is equal to or smaller than the first predetermined value, if the PDOP value is equal to or smaller than the second predetermined value, and also if the distance is equal to or greater than the third predetermined value.

4 Claims, 5 Drawing Sheets

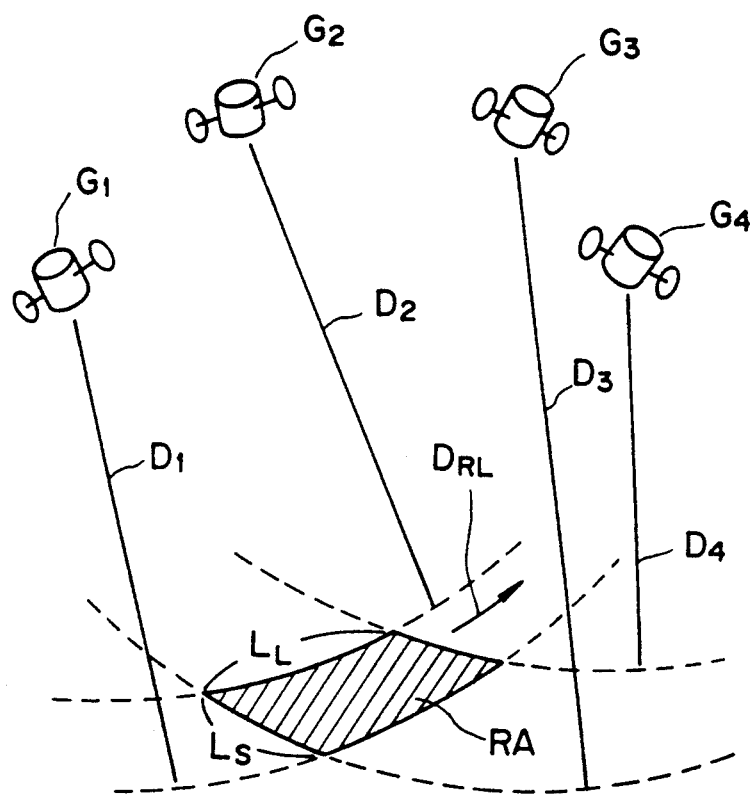
F I G. 5

NAVIGATION SYSTEM

BACKGROUND OF THE INVENTION

The present invention relates to a navigation system, and more particularly to a navigation system incorporating a global positioning system (GPS) receiver and a self-operating sensor for determining the position of a reception point or a mobile object such as an automobile in a global geometrical region.

There are known navigation systems incorporating global positioning system (GPS) for navigating various mobile objects such as automobiles, airplanes, ships, or the like in a global geometrical region. Typically, such a navigation system on a mobile object has a GPS receiver which receives radio waves transmitted from three or more GPS satellites, determines the position of a reception point where its radio-wave receiver has received the radio waves, based on quasi-distance data between the GPS satellites and the reception point, including a time offset of the receiver, and positional data of the GPS satellites, and outputs the data about the determined position. Since, however, the radio waves from the GPS satellites may not necessarily be received under good conditions because of receiving environments and weather conditions, some navigation systems which incorporate a GPS receiver are also combined with a self-operating sensor which produces the positional data of its own. In operation, the navigation system selects whichever of the data from the GPS receiver and the self-operating sensor is more accurate at the time for higher positioning accuracy for better navigation. The self-operating sensor for use in automobile navigation systems may comprise an orientation sensor such as a geomagnetic sensor or a gas-rate gyroscope, or a speed sensor such as a sensor for detecting the rotational speed of a crankshaft.

One known navigation system comprising a GPS receiver and a self-operating sensor is disclosed in Japanese laid-open patent publication No. 60-239794, for example. The disclosed navigation system employs a PDOP (Position Dilution Of Precision) value for determining the accuracy with which the GPS receiver determines the position. If the PDOP value is equal to or lower than a predetermined value, then the navigation system selects the data from the GPS receiver for navigation. The PDOP value is used in a three-dimensional positioning system in which the three-dimensional position of a reception point is determined by simultaneously measuring the distances up to four or more GPS satellites. The PDOP value is representative of how positional errors of the GPS satellites are reflected by the calculated present position of the reception point. If the PDOP value is larger, then it indicates that the calculated present position of the reception point is suffering a greater error.

Inasmuch as the known navigation system determines the positional accuracy of the data according to the PDOP value, however, when only a two-dimensional positioning process is available for some reason, i.e., when the PDOP value cannot be obtained, then the navigation system cannot detect a reduction in the positional accuracy owing to an error caused by a change in the altitude of the reception point. Another problem is that in the event of an intentional accuracy reduction known as selective availability (SA), the PDOP value itself is caused to contain an error, resulting in a lower degree of positional accuracy. The navigation system determines whether it is to select the data from the GPS receiver or the data from the self-operating sensor, solely based on the positional accuracy of the GPS receiver. Consequently, once the positional accuracy of the data from the GPS receiver is determined to be low according to the PDOP value, the navigation system automatically selects the data from the self-operating sensor even when the positional accuracy of the data from the self-operating sensor is actually lower than the positional accuracy of the data from the GPS receiver.

SUMMARY OF THE INVENTION

It is an object of the present invention to provide a navigation system for determining the position of a reception point or a mobile object with increased accuracy for better navigation.

According to the present invention, there is provided a navigation system for use on a mobile object, comprising GPS positioning means for receiving radio waves from GPS satellites, determining the present position of the mobile object based on the received radio waves, and outputting firs positional data indicative of the determined position, self-operating positioning means having a sensor on the mobile object for determining the present position of th mobile object and outputting second positional data indicative of the determined position, first positional data comparing means for comparing previous first positional data and the present first positional data to determine whether the difference between the previous and present first positional data is equal to or smaller than a first predetermined value, PDOP value determining means for determining whether a PDOP value of the present first positional data is equal to or smaller than a second predetermined value, distance determining means for comparing the present first positional data and the second positional data to determine whether the distance between the present position of the mobile object as indicated by the present first positional data and the present position of the mobile object as indicated by the second positional data is equal to or greater than a third predetermined value, and selecting means for outputting the first positional data as present positional data if the difference between the previous first positional data and the present first positional data is equal to or smaller than the first predetermined value, if the PDOP value is equal to or smaller than the second predetermined value, and also if the distance is equal to or greater than the third predetermined value.

The distance determining means may update the third predetermined value based on quasi-distances up to the GPS satellites as determined by the GPS positioning means.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 5 is a schematic view of a navigation system according to another embodiment of the present invention.

DETAILED DESCRIPTION OF THE PREFERRED EMBODIMENTS

Figure 1:
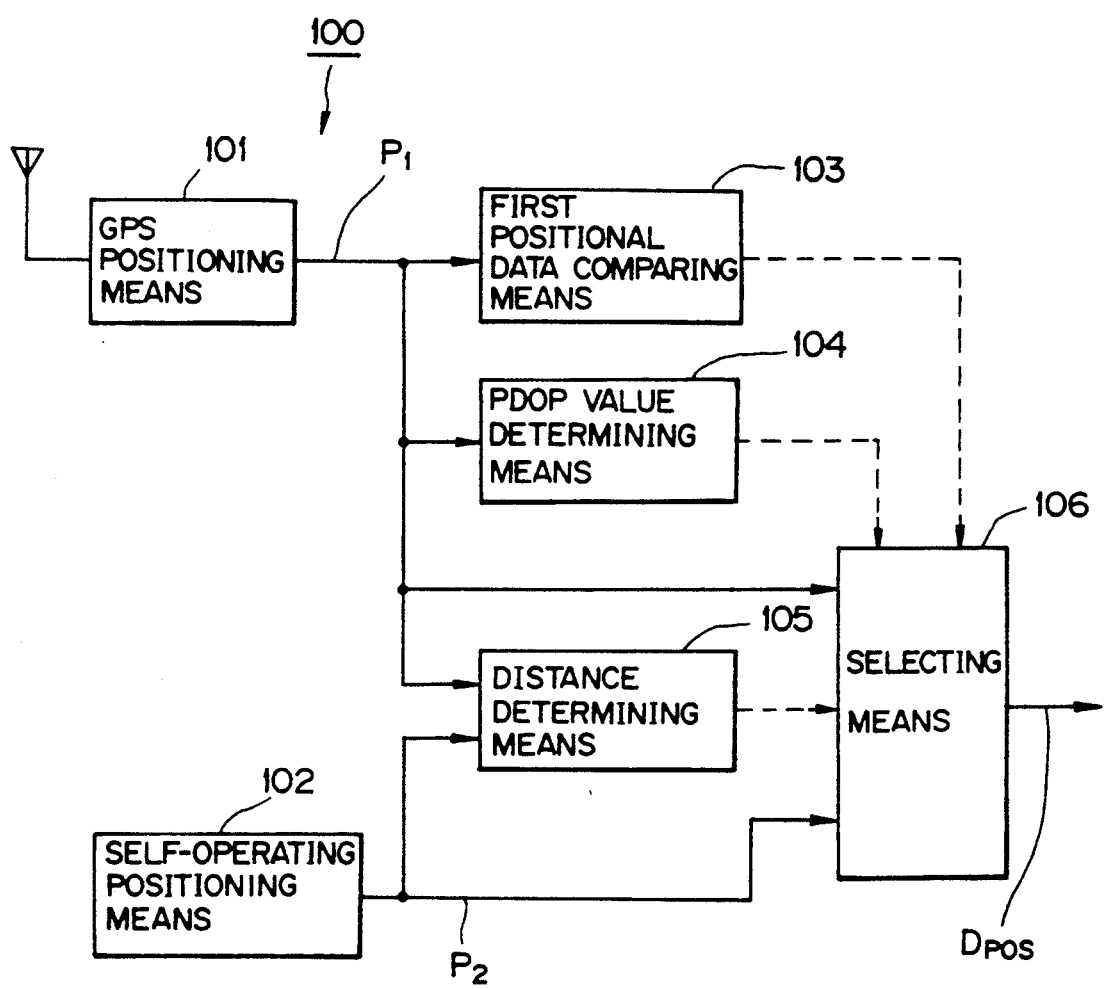
FIG. 1 is a block diagram showing the principles of the present invention.

FIG. 1 shows the principles of the present invention.

As shown in FIG. 1, a navigation system 100 on a mobile object includes a GPS positioning means 101 for receiving radio waves from a plurality of GPS satellites, determining the present position of the mobile object based on the received radio waves, and outputting first positional data $P_1$ indicative of the determined position, a self-operating positioning means 102 having a sensor on the mobile object for determining the present position of the mobile object and outputting second positional data $P_2$ indicative of the determined position, a first positional data comparing means 103 for comparing previous first positional data $P_1$ and the present first positional data $P_1$ to determine whether the difference between the previous and present first positional data is equal to or smaller than a first predetermined value, a PDOP value determining means 104 for determining whether a PDOP value of the present first positional data $P_1$ is equal to or smaller than a second predetermined value, a distance determining means 105 for comparing the present first positional data $P_1$ and the second positional data $P_2$ to determine whether the distance between the present position of the mobile object as indicated by the present first positional data $P_1$ and the present position of the mobile object as indicated by the second positional data $P_2$ is equal to or greater than a third predetermined value, and a selecting means 106 for outputting the first positional data $P_1$ as present positional data $D_{POS}$ if the difference between the previous first positional data $P_1$ and the present first positional data $P_1$ is equal to or smaller than the first predetermined value, if the PDOP value is equal to or smaller than the second predetermined value, and also if the distance is equal to or greater than the third predetermined value.

The GPS positioning means 101 receives radio waves from the GPS satellites, and outputs the first positional data $P_1$ to the first positional data comparing means 103, the PDOP determining means 104, and the distance determining means 105. The self-operating positioning means 102 produces the second positional data $P_2$ based on a detected signal from the sensor, and outputs the second positional data $P_2$ to the distance determining means 105.

The first positional data comparing means 103 compares the previous first positional data $P_1$ and the present first positional data $P_1$ to determine whether the difference between the previous and present first positional data is equal to or smaller than the first predetermined value. The PDOP value determining means 104 determines whether the PDOP value of the present first positional data $P_1$ is equal to or smaller than the second predetermined value. The distance determining means 105 compares the present first positional data $P_1$ and the second positional data $P_2$ to determine whether the distance between the present position of the mobile object as indicated by the present first positional data $P_1$ and the present position of the mobile object as indicated by the second positional data $P_2$ is equal to or greater than the third predetermined value.

Based on the determined results of the first positional data comparing means 103, the PDOP determining means 104, and the distance determining means 105, the selecting means 106 outputs the first positional data $P_1$ as the present positional data $D_{POS}$ is if the difference between the previous first positional data $P_1$ and the present first positional data $P_1$ is equal to or smaller than the first predetermined value, if the $P_{DOP}$ value is equal to or smaller than the second predetermined value, and also if the distance is equal to or greater than the third predetermined value.

The navigation system employs whichever of the positional data from the GPS positioning means and the self-operating positioning means is more accurate, for highly accurate navigation.

Figure 2A:
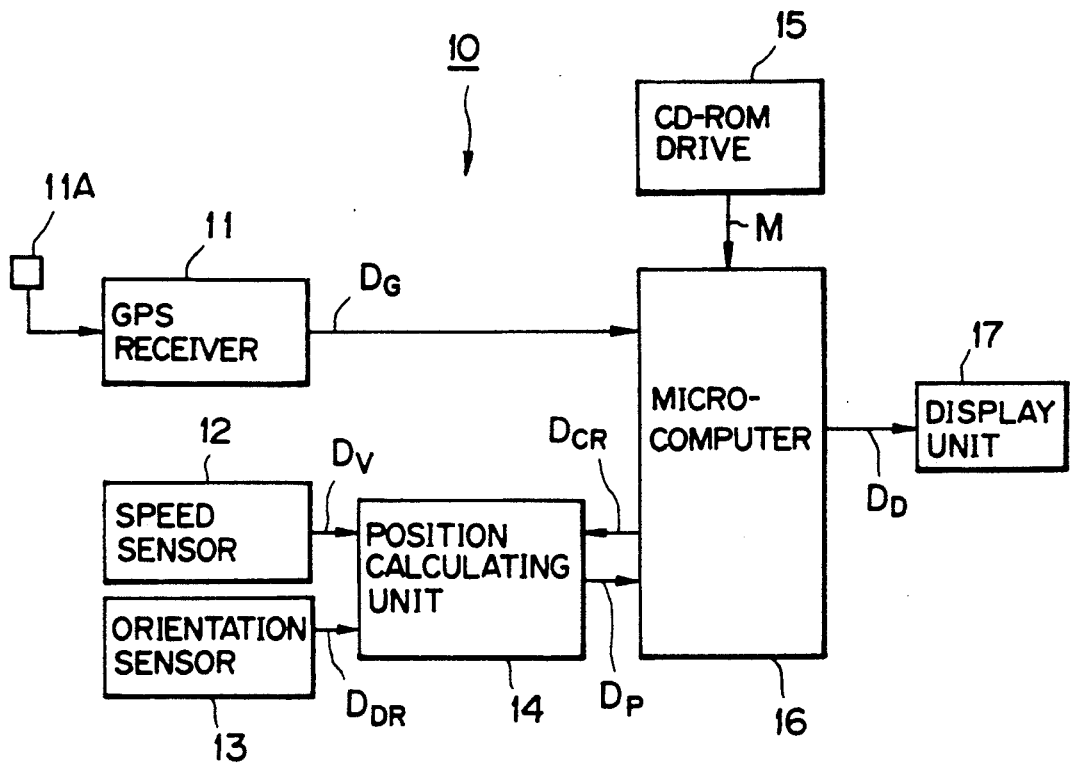
FIGS. 2A and 2B are block diagrams of a navigation system according to the present invention.
Figure 2B:
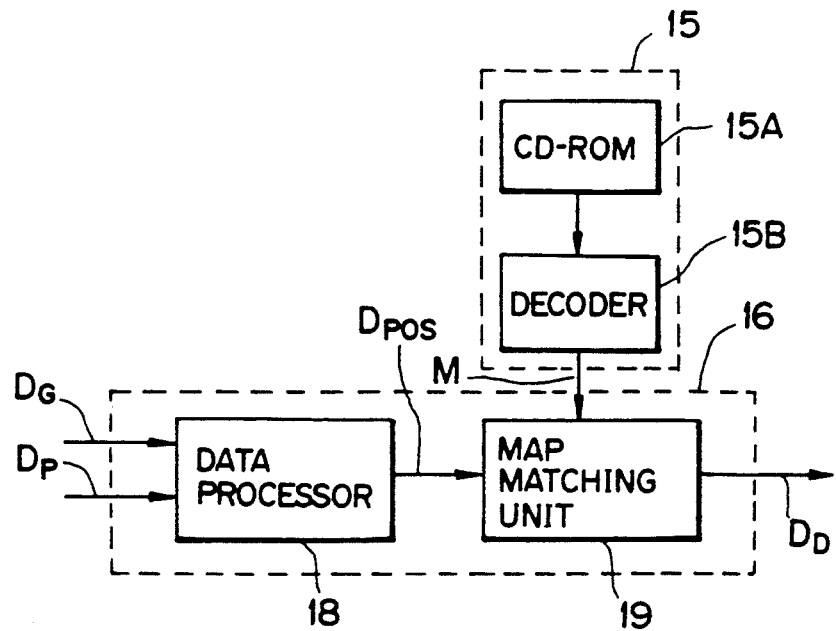

FIGS. 2A and 2B show in block form a navigation system according to the present invention. By way of example, the navigation system shown in FIGS. 2A and 2B is incorporated in an automobile.

As shown in FIG. 2A, the navigation system, generally designated by the reference numeral 10, comprises a GPS receiver 11 for receiving radio waves from GPS satellites through a GPS antenna 11A and outputting GPS positional data $D_G$ based on the received radio waves, a speed sensor 12 for detecting the speed of travel of the automobile based on the rotational speed of the drive shaft of the automobile and outputting speed data $D_V$ indicative of the detected speed, an orientation sensor 13 such as a gas rate gyroscope or a geomagnetic sensor for outputting orientation data $D_{DR}$ indicative of the orientation of the automobile, a position calculating unit 14 for outputting positional data $D_P$ based on the speed data $D_V$ from the speed sensor 12 and the orientation data $D_{DR}$ from the orientation sensor 13, the position calculating unit 14 having a memory for storing previous GPS positional data $D_G$, a microcomputer 16 for reading map data M from a CD-ROM drive 15, matching positional data to the map data M, outputting display data $D_D$ to display the position of the automobile on a map, and outputting corrective data $D_{CR}$ as an offset value to correct the positional data $D_P$ to the position calculating unit 14, and a display unit 17 for displaying the position of the automobile on the map based on the display data $D_D$. The GPS receiver 11 corresponds to the GPS positioning means 101 shown in FIG. 1. The speed sensor 12, the orientation sensor 13, and the position calculating unit 14 jointly correspond to the self-operating positioning means 102 (which will also be hereinafter referred to as a "self-operating sensor") shown in FIG. 1.

As shown in FIG. 2B, a CD-ROM 15A storing map data M is loaded in the CD-ROM drive 15. The map data M read from the CD-ROM drive 15 is outputted through a decoder 15B to the microcomputer 16.

As shown in FIG. 2B, the microcomputer 16 comprises a data processor 18 for outputting present position data $D_{POS}$ indicating the present position of the automobile based on the GPS positional data $D_G$ and the positional data $D_P$, and a map matching unit 19 for matching the present position data $D_{POS}$ to the map data M from the CD-ROM drive 15, and outputting the display data $D_D$. The data processor 18 corresponds to the first positional data comparing means 103, the PDOP determining means 104, the distance determining means 105, and the selecting means 106 shown in FIG. 1.

Figure 3:
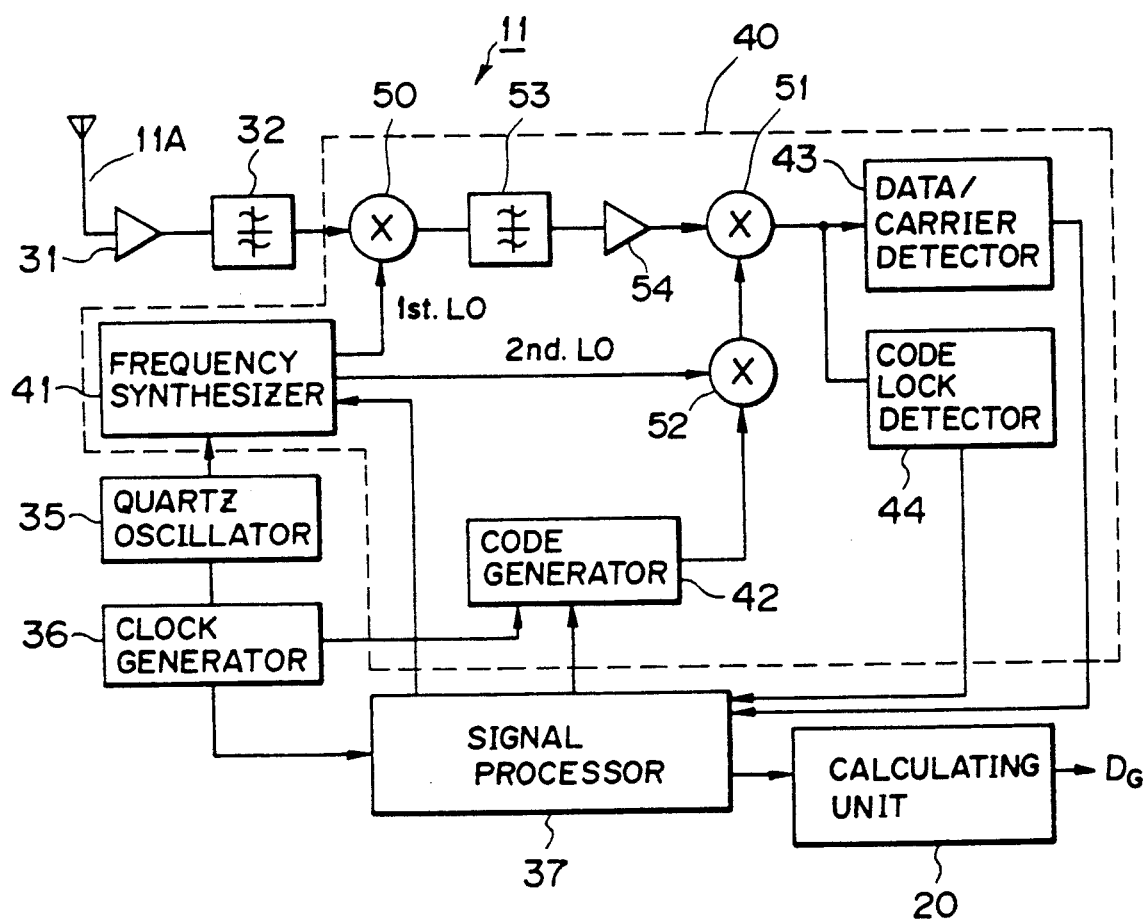
FIG. 3 is a detailed block diagram of a GPS receiver of the navigation system.

The GPS receiver 11 will be described in detail below with reference to FIG. 3.

The GPS antenna 11A is connected to a GPS receiver unit 40 through a preamplifier 31 and a bandpass filter 32. The GPS receiver 11 has a quartz oscillator 35 for producing a reference frequency signal as a timing control signal, and a clock generator 36 for generating a clock signal based on the reference frequency signal, a signal processor 37 for processing various signals using the clock signal as an operation timing signal, and a calculating unit 20 for generating and outputting GPS positional data $D_G$ based on an output signal from the signal processor 37.

The GPS receiver unit 40 has a frequency synthesizer 41 responsive to the reference frequency signal from the quartz oscillator 35 and a signal from the signal processo 37 for generating a signal having the same pattern as the data relative to the signal carrier of the GPS satellites the position of the GPS satellites, and the clocks in the GPS satellites. A code generator 42 generates a code signal having the same pattern as distance signals from the GPS satellites in response to the clock signal from the clock generator 36 and the signal from the signal processor 37. Based on output signals from the frequency synthesizer 41 and the code generator 42, a data/carrier detector 43 detects, by way of correlation detection, data relative to the clocks in the GPS satellites and the orbits of the GPS satellites, and the signal carrier of the GPS satellites. A code lock detector 44 detects, by way of correlation detection, the distance signals with the code signal from the code signal generator 42.

Reference numerals 50, 51 and 52 denote mixers, respectively, reference numeral 53 denotes a band-pass filter and reference numeral 54 denotes an amplifier.

Figure 4:
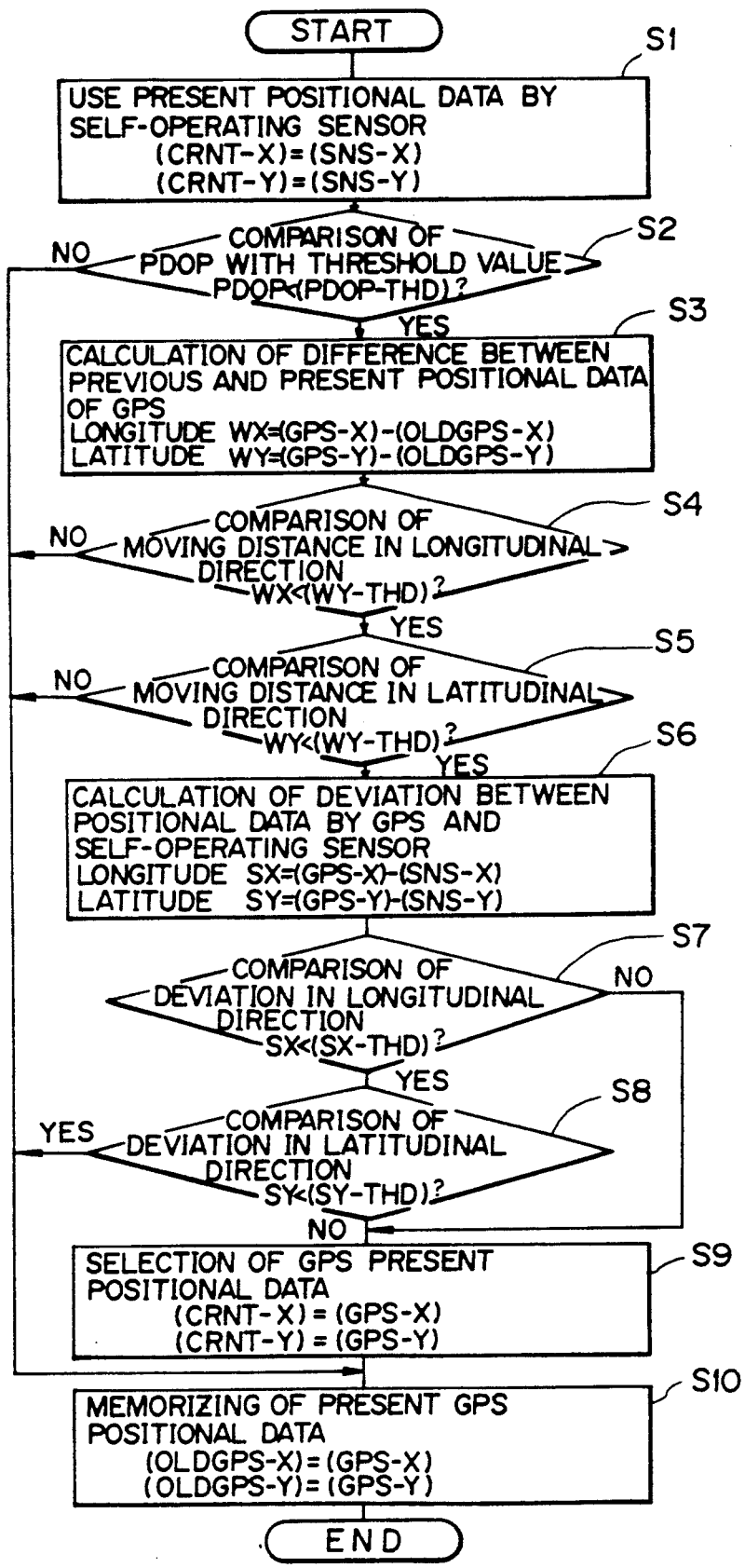
FIG. 4 is a flowchart of an operation sequence of the navigation system.

An operation sequence of the navigation system shown in FIGS. 2A, 2B, and 3 will be described below with reference to FIG. 4.

While the positional data is being matched to the map data in the navigation system, the present position of the automobile as determined by the self-operating sensor is generally more accurate than the present position as determined by the GPS receiver. Specifically, the accuracy of the positional data as determined by the self-operating sensor contains an error of up to road widths in a lateral direction and an error of up to about several tens meters in a back-and-forth direction. The accuracy of the positional data as determined by the GPS receiver contains an error of about ±30 m without SA (Selective Availability) and about ±100 m with SA. In this embodiment, the navigation system normally employs the positional data from the self-operating sensor as present position data.

First, in a step S1, the data processor 18 establishes longitude data SNS−X and latitude data SNS−Y which are read from the self-operating sensor at present, respectively as present longitude positional data CRNT−X and present latitude positional data CRNT−Y as indicated by the following equations:

$$CRNT-X=SNS-X,$$

$$CRNT-Y=SNS-Y.$$

Then, the data processor 18 determines a PDOP value PDOP from the GPS positional data $D_G$, and compares the determined PDOP value PDOP with a predetermined PDOP threshold value PDOP−THD in a step S2. If the PDOP value PDOP determined from the GPS positional data $D_G$ is equal to or greater than the PDOP threshold value PDOP−THD, then control jumps from the step S2 to step S10. That is, the GPS data is memorized in the microcomputer 16, and the positional data $D_P$ by the self-operating sensor is used as a present positional data.

If the PDOP value PDOP determined from the GPS positional data $D_G$ is smaller than the PDOP threshold value PDOP−THD, then the data processor 18 determines the difference between previous and present positional data determined by the GPS receiver 11 in a step S3. More specifically, the data processor 18 determines a longitude distance WX that the automobile has traveled, which is the difference between the present longitude data GPS−X and previously determined longitude data OLDGPS−X, and a latitude distance WY that the automobile has traveled, which is the difference between the present latitude data GPS−Y and previously determined latitude data OLDGPS−Y, according to the following equations:

$$WX=(GPS-X)-(OLDGPS-X),$$

$$WY=(GPS-Y)-(OLDGPS-Y).$$

Then, the data processor 18 determines whether the determined longitude distance WX is smaller than a predetermined longitude distance threshold value WX−THD or not in a step S4. If the longitude distance WX is equal to or larger than the longitude distance threshold value WX−THD, then control jumps from the step S4 to the step S10.

If the longitude distance WX is smaller than the longitude distance threshold value WX−THD, then the data processor 18 determines whether the determined latitude distance WY is smaller than a predetermined latitude distance threshold value WY−THD or not in a step S5. If the latitude distance WY is equal to or larger than the latitude distance threshold value WY−THD, then control jumps from the step S5 to the step S10.

In the steps S4, S5, it is checked whether or not the position as detected by the GPS receiver 11 is changed abruptly due to any reasons such as SA. If NO in the steps S4 or S5, the present positional data by the self-operating sensor is used.

If the latitude distance WY is smaller than the latitude distance threshold value WY−THD, then the data processor 18 determines, in a step S6, a longitude deviation SX corresponding to the difference between the present longitude data SNS−X from the self-operating sensor and the present longitude data GPS−X from the GPS receiver 11, and also a latitude deviation SY corresponding to the difference between the present latitude data SNS−Y from the self-operating sensor and the present latitude data GPS−Y from the GPS receiver 11, according to the following equations:

$$SX=(GPS-X)-(SNS-X),$$

$$SY=(GPS-Y)-(GPS-Y).$$

Thereafter, the data processor 18 determines whether the longitude deviation SX is smaller than a predetermined longitude deviation threshold value SX−THD or not in a step S7. If the longitude deviation SX is equal to or greater than the predetermined longitude deviation threshold value SX−THD, then control jumps from the step S7 to a step S9.

If the longitude deviation SX is smaller than the predetermined longitude deviation threshold value SX−THD, then the data processor 18 determines whether the latitude deviation SY is smaller than a predetermined latitude deviation threshold value SY−THD or not in a step S8. If the latitude deviation SY is smaller than the predetermined latitude deviation threshold value SY−THD, then control jumps from the step S8 to the step S10.

If the latitude deviation SY is equal to or greater than the predetermined latitude deviation threshold value SY−THD, then the data processor 18 selects the positional data from the GPS receiver 11 as present positional data in the step 9. Specifically, the data processor 18 establishes the present longitude and latitude data GPS−X, GPS−Y from the GPS receiver 11 respectively as present longitude positional data CRNT−X and present latitude positional data CRNT−Y as indicated by the following equations:

$$CRNT-X = GPS-X,$$

$$CRNT-Y = GPS-Y.$$

Then, in the step S10, the data processor 18 stores the present longitude and latitude data GPS−X, GPS−Y from the GPS receiver 11 in its memory as follows:

$$OLDGPS-X = GPS-X,$$

$$OLDGPS-Y = GPS-Y.$$

The operation sequence is now ended.

As described above, the present positional data as determined by the GP receiver 11 is used to indicate the present position of the automobile if the difference between the present position as determined by the self-operating sensor and the present position as determined by the GPS receiver is equal to or greater than a predetermined value, if the PDOP value of the GPS receiver is equal to or smaller than a predetermined value, and also if the positional data are continuous, i.e., if the difference between the present position as determined by the GPS receiver previously and the present position a determined by the GPS receiver at present is equal to or smaller than a predetermined value. That is, when all conditions shown in FIG. 4 are satisfied, GPS data are generally reliable while data of the self-operating sensor include a large error. Accordingly, the navigation system can navigate the automobile with higher accuracy.

In the above embodiment, the threshold values (=SX−THD, SY−THD) for determining the difference between the present position as determined by the self-operating sensor and the present position as determined by the GPS receiver are predetermined values. However, as shown in FIG. 5, quasi-distances $D_1$ through $D_4$ up to respective four GPS satellites $G_1$ through $G_4$ may be determined, and predetermined values (=SX−THD, SY−THD) for determining the difference between the present position as determined by the self-operating sensor and the present position as determined by the GPS receiver may be determined based on the length $L_L$ of a longer axis, the length $L_S$ of a shorter axis, and the orientation information $D_{RL}$ of the longer axis, of an approximately rectangular region RA surrounded by a sphere that is obtained using the quasi-distances $D_1$ through $D_4$. That is, using the quasi-distances $D_1$ through $D_4$, the rate at which a positional data error in one direction (e.g., the latitude direction) is produced may be determined based on the orientation information $D_{RL}$ of the longer axis and the length $L_L$ of the longer axis, and the rate at which a positional data error in another direction (e.g., the longitude direction) perpendicular to said one direction is produced may be determined based on the orientation information $D_{RL}$ of the longer axis and the length $L_S$ of the shorter axis, for the determination of the present position. The predetermined values (=SX−THD, SY−THD) may be updated based on the determined rates for more accurate navigation.

Although certain preferred embodiments of the present invention have been shown and described in detail, it should be understood that various changes and modifications may be made therein without departing from the scope of the appended claims.

What is claimed is:

1. A navigation system for use on a mobile object, comprising:
   GPS positioning means for receiving radio waves from GPS satellites, determining a present position of the mobile object based on the received radio waves, and outputting first positional data indicative of the determined position;
   self-operating positioning means having a sensor on the mobile object for determining a present position of the mobile object and outputting second positional data indicative of the determined position;
   first positional data comparing means for comparing previous first positional data and the present first positional data to determine whether the difference between the previous and present first positional data is equal to or smaller than a first predetermined value;
   PDOP value determining means for determining whether a PDOP value of the present first positional data is equal to or smaller than a second predetermined value;
   distance determining means for comparing the present first positional data and the second positional data to determine whether the distance between the present position of the mobile object as indicated by the present first positional data and the present position of the mobile object as indicated by the second positional data is equal to or greater than a third predetermined value; and
   selecting means for outputting the first positional data as present positional data if the difference between the previous first positional data and the present first positional data is equal to or smaller than the first predetermined value, if the PDOP value is equal to or smaller than the second predetermined value, and also if the distance is equal to or greater than the third predetermined value.

2. A navigation system according to claim 1, wherein said distance determining means comprises means for updating said third predetermined value based on quasi-distances up to the GPS satellites as determined by said GPS positioning means.

3. A navigation system according to claim 1, wherein said self-operating positioning means comprises a speed sensor, an orientation sensor and a position calculating unit for calculating position data based on speed data by the speed sensor and orientation data by the orientation sensor.

4. A navigation system according to claim 1, further comprising a CD-ROM for memorizing map data, a map matching unit for performing map matching based on the present positional data and the map data and a display unit for displaying a position of the mobile object.

* * * * *